E. N. HEARD.
LOCK.
APPLICATION FILED NOV. 29, 1912.
1,102,660.
Patented July 7, 1914.
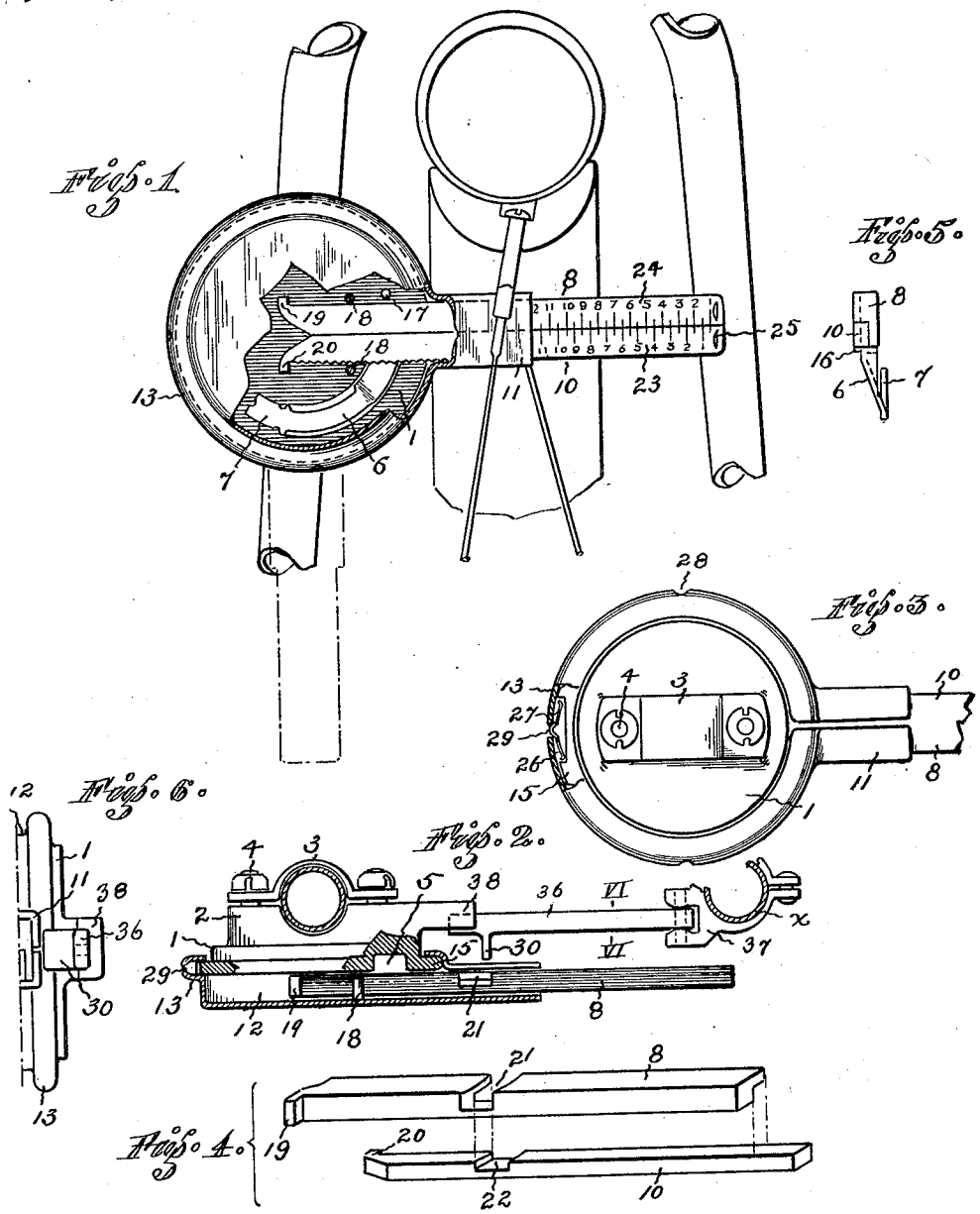
WITNESSES
INVENTOR
Eugene N. Heard.
BY
Baldwin Vale.
ATTORNEY

UNITED STATES PATENT OFFICE.

EUGENE N. HEARD, OF OAKLAND, CALIFORNIA.

LOCK.

1,102,660.  Specification of Letters Patent.  Patented July 7, 1914.

Application filed November 29, 1912. Serial No. 734,070.

*To all whom it may concern:*

Be it known that I, EUGENE N. HEARD, a citizen of the United States, and a resident of the city of Oakland, county of Alameda, State of California, have invented new and useful Improvements in Locks, of which the following is a specification.

This invention relates to improvements in locks and more particularly to permutation locks.

The objects of the invention are to produce a permutation lock applicable to the locking of bicycles, motorcycles and the like, and to produce a lock at a reasonably low price, comparatively safe, neat, strong and adapted to become a permanent fixture in its application.

Broadly stated the invention consists of a concentric base with attaching means thereon, and a spring stop mounted therein, graduated slide bars with notches thereon normally engaging said stop, and gaps in each bar adapted to clear the stop when said gaps register and are in coincidence with the stop, and a metal casing inclosing said mechanism and crimped over the edge of said concentric base, and a hasp bar pivoted on a center removed from said lock and adapted to engage a socket formed on the base of the lock. If applied to a cycle the lock would be clamped on one side bar of the fork holding the wheel in the frame, the hasp bar being pivoted on the opposite bar of the fork so that when the hasp bar was engaged in the socket of the base of the lock and the slide bars of the lock swung over the socket and locked, the hasp bar could not be moved. The slide bars and the hasp bar extend between two spokes of the wheel to prevent its revolving. The hasp is added as a protection to the slide bars of the lock, should forcible revolution of the wheel be attempted.

In the drawings: Figure 1 is a front elevation of a lock constructed in accordance with this invention, as applied to the rear fork of a bicycle frame. A part of the casing of the lock is broken away to disclose the internal construction of the lock. Fig. 2 is a plan view from above of the same also partially in cross section, and disclosing the hasp bar in combination with the lock. Fig. 3 is a rear elevation of the lock disclosing the bracket for attaching the base of the lock to the bicycle frame and partially broken away to disclose the spring detent for holding the lock casing in inoperative position. Fig. 4 is a perspective view of the slide bars of the lock in disassociated positions. Fig. 5 is a side elevation detail of the spring stop of the lock. Fig. 6 is a vertical cross section on the line VI—VI showing the hasp bar engaged in the socket in the base of the lock.

In detail the construction consists of the concentric base 1 having the attaching bracket 2 formed thereon. The yoke 3 engages the studs 4 fixed in the bracket 2 and is secured by the spanner nuts screwed on the studs. As an additional precaution against removal, the studs can be riveted outside the spanner nuts. The base is provided with the segmental depression 5 within which the spring stop 6 is mounted. The depth of the depression is equal to the height of the stop. The end of the stop is secured by soldering or otherwise, in a socket formed at the end of the depression, the end 7 being flush with the plane of the base 1.

The slide bar 8 has an angular longitudinal channel equal in cross section to the cross section of the bar 10. The bar 10 completes the rectangular cross section of the bar 8, whereby all planes of the rectangle are flush. The combined bars are inclosed and slidable within the neck 11 of the casing 12 of the lock. The bars are also independently slidable with respect to each other. The edges 13 of the casing are curled or crimped over the edge 14 of the base flange 15.

The casing rotates freely on the base, and is concentrically guided by the engagement of the edge with the flange 15. The casing is locked in the fixed position by the stop pin and the spring stop 6. The top of the head of the stop is provided with transverse notches adapted to engage similar notches 16 formed in both slide bars. In the present application the locked position is horizontal. This is determined by the placing of the stop 6 and the stop pin 17 fixed in the base against which the slide bars strike. The lugs 19 and 20 formed upon each of the slide bars engage the pins 18—18 fixed in the casing and projecting inward to prevent the withdrawal of the bars from the neck or casing. To accomplish the locking operation, the slide bars are swung into contact with the pin 17. The swing of the casing causes the bars to slide over the spring stop 6 depressing it into the segmental depression 5. After the passage of the slide bars the spring stop rises, effectually stopping the reverse movement of the slide bars. The unlocking operation consists in sliding the bars 8 and 10 until the gaps 21 and 22 in the bars coincide. This coincidence is determined by the two predetermined points on the graduated scales 23 and 24 on the respective bars. In the present instance the numerals "9" and "7" on the respective bars are the "combination". The numeral "9" on the bar 24 is slid into line with the end of the neck 11. The numeral line "7" on the bar 23 is slid into the same position. The register of these two numerals with the end of the neck brings both gaps into coincidence with the spring stop 6. This relation of the parts permits the slide bars to pass the spring stop and the casing to swing into the unlocked position. The number of combinations possible by varying the position of the gaps with respect to the graduations are sufficiently obvious.

The notches 16 in the bars engaging the notches in the head of the spring stop prevent "picking" of a lock by sliding the bars across the spring stop and "feeling" for the gaps, as might be done if the stop was smooth. With the notches present it is necessary to lift the bars out of engagement with the stop to slide them on each other. Sufficient space is left between the stop pin 17 and the head of the spring stop to clear the notches in the bars and the spring stop. The probability is remote of accidentally bringing the gaps into register with each other and also into coincidence with the stop 6, inasmuch as the engagement of one notch of either bar with the stop will lock both bars. The crescent shaped depressions 25 provide engagement of the finger nail of the operator to facilitate manipulation of the slide bars.

The base flange 15 is cut away to receive the spring 27 adapted to bear against the inner surface of the edge 13 to frictionally hold the casing in any desired position. The recess 28 in the edge 13 engages the embossment 29 on the spring to more definitely hold the casing in set position.

As described the lock serves its purpose very well in connection with bicycles or other applications where lightness and sightliness are considerations. In its application to motorcycles, or where demands for strength are greater, the hasp bar is combined with the lock to relieve the latter of direct strains and abuse. The hasp consists of the bar 36 pivoted on a horizontal pin passing through the end of the bar and fixed in the bracket 37 fixed upon the bar $x$ of the frame of the machine. The hasp has a free vertical swing and a slight lateral play. This play allows the free end of the bar to be swung into the socket 38 formed on the base 1 of the lock, when the neck 11 is not in the "locked" position of the lock. The flanged projection 30 bridges the space between the plane of the socket 38 and the neck or bars of the lock, and prevents disengagement of the hasp from the socket. With the hasp and slide bars extending across the frame between two spokes of the wheel, revolution of the wheel is impossible.

It is obvious that the lock could be otherwise applied to the machine. The drive sprockets, or chain, or the engine control might be locked. Modifications and variations to suit conditions could be made without departing from the spirit of this invention. I do not wish to be confined to the specific construction shown and described, nor to this particular application of the lock. Other uses for the same general construction of the invention will suggest themselves to those skilled in the art. The range of "combinations" can be extended by increasing the number of slide bars.

Having thus described this invention, what is claimed and desired to be secured by Letters Patent is:

1. A permutation lock comprising a concentric base adapted to be fastened adjacent to a vehicle wheel, a stop depressible below the plane of said base, slide bars rotatable across said base and locked between two spokes of said vehicle wheel by said stop.

2. A permutation lock comprising a base, a stop depressible below the plane of said base, slide bars rotatable across said base, gaps in said slide bars larger than the cross section of said stop.

3. A permutation lock comprising a concentric base, a spring stop fixed in said base, graduated slide bars slidable in a casing rotatable on said base, gaps in said slide bars adapted to pass said spring stop.

4. A permutation lock comprising a concentric base with attaching means thereon, a spring stop fixed in said base, graduated slide bars slidable in a casing rotatable on said base, a stop pin fixed in said base spaced from said spring stop the width of said slide bars, and gaps in said slide bars adapted to pass said spring stop.

5. A permutation lock comprising a base, bars slidable on each other and rotatable across the plane of said base, a fixed stop and a movable stop fixed to said base and interposed in the path of said bars.

6. A permutation lock comprising a base with a depressible stop therein, slide bars with notches on their edges contiguous to notches on said stop, a stop pin fixed in said base and spaced from said depressible stop, and an inclosing casing.

7. A permutation lock comprising a base with a concentric flange, a casing engaging said flange and having a neck, bars slidable in said neck, a stop depressibly mounted in said base, gaps in said slide bars adapted to pass said stop coengaging notches in said bars and the head of said stop.

8. A permutation lock comprising a concentric base, a spring stop fixed in said base, slide bars slidable in a casing rotatable on said base, gaps in said slide bars adapted to pass said stop, a spring inclosed in a recess in said base and bearing against said casing.

9. A lock comprising a base, a socket formed in said base, a hasp engaging said socket, and a lock on said base coöperating with said socket to lock said hasp therein.

10. A lock comprising a base, a socket formed in said base, a pivotal hasp engaging said socket, and a permutation lock pivotal on said base and having a neck coöperating with said socket to lock said hasp therein.

11. A permutation lock comprising a concentric base with attaching means thereon and having a segmental depression below the plane thereof, a spring stop fixed in said depression, graduated slide bars with notches thereon normally engaging said stop, and gaps in each of said bars adapted to clear the stop when said gaps register and are in coincidence with said stop, a metal casing engaging the edge of said concentric base and having a neck inclosing said slide bars; and a socket formed upon said base, and a pivoted hasp adapted to engage said socket.

12. A permutation lock comprising a concentric base with attaching means thereon, and having a segmental depression below the plane thereof, a spring stop fixed in said depression, graduated slide bars with notches thereon normally engaging said stop, and gaps in each of said bars adapted to clear said stop when said gaps register and are in coincidence with said stop, lugs on said slide bars, a metal casing engaging the edge of said concentric base and having a neck inclosing said slide bars, pins fixed in said casing in the path of the said lugs on the slide bars.

In testimony whereof, I have hereunto set my hand, this 6th day of November 1912.

EUGENE N. HEARD.

In presence of—
BALDWIN VALE,
H. G. PROST.

---

Copies of this patent may be obtained for five cents each, by addressing the "Commissioner of Patents, Washington, D. C."